United States Patent [19]
Monett

[11] 3,921,954
[45] Nov. 25, 1975

[54] MOLDING APPARATUS FOR MAKING AN INTRAUTERINE DEVICE

[75] Inventor: Edward Monett, Westfield, N.J.

[73] Assignee: Roller Corporation of America, South Plainfield, N.J.

[22] Filed: Aug. 6, 1973

[21] Appl. No.: 385,681

[52] U.S. Cl. ............... 249/88; 249/91; 249/95
[51] Int. Cl.² ............................ B22D 19/08
[58] Field of Search .......... 249/85, 95, 88, 91, 141; 425/111, 129; 164/112, 332, 334

[56] References Cited
UNITED STATES PATENTS

| | | | |
|---|---|---|---|
| 2,890,505 | 6/1959 | Brand | 164/334 |
| 3,068,522 | 12/1962 | Nickerson et al. | 425/116 |
| 3,132,196 | 5/1964 | Veatch | 249/95 X |
| 3,328,846 | 7/1967 | Morin | 425/129 X |
| 3,507,274 | 4/1970 | Soichet | 128/267 X |
| 3,592,887 | 7/1971 | Edwards | 425/129 X |
| 3,608,034 | 9/1971 | Bramley et al. | 264/251 |
| 3,723,036 | 3/1973 | Maguire et al. | 425/129 |
| 3,811,435 | 5/1974 | Soichet | 128/130 |

Primary Examiner—Francis S. Husar
Assistant Examiner—Carl Rowold
Attorney, Agent, or Firm—Cooper, Dunham, Clark, Griffin & Moran

[57] ABSTRACT

Molding apparatus for making an intrauterine device. Stainless steel spring wire covered by silicone rubber and preformed generally in a V-shape is positioned within a mold and retained in position by guide pins. The arms of the V are stressed slightly toward each other so that they have an outward bias. Silicone rubber is introduced into the mold to overcoat the already coated wire and to provide a flexible web of material joining together the arms of the V. Additionally a tail is molded onto the bottom of the V. During the molding process, air is vented from the mold to avoid flaws in the finished product.

4 Claims, 15 Drawing Figures

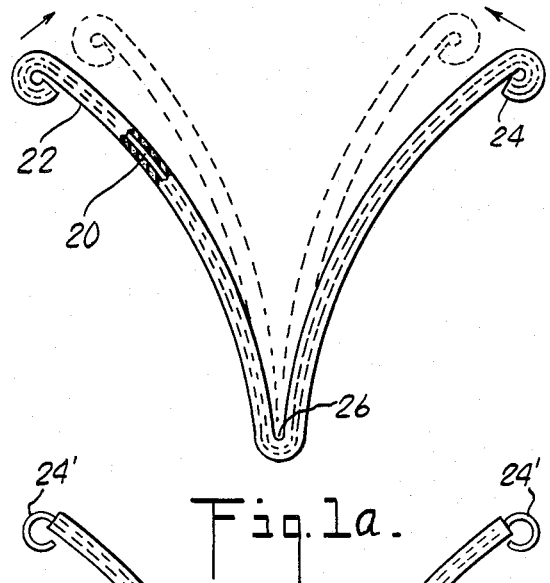
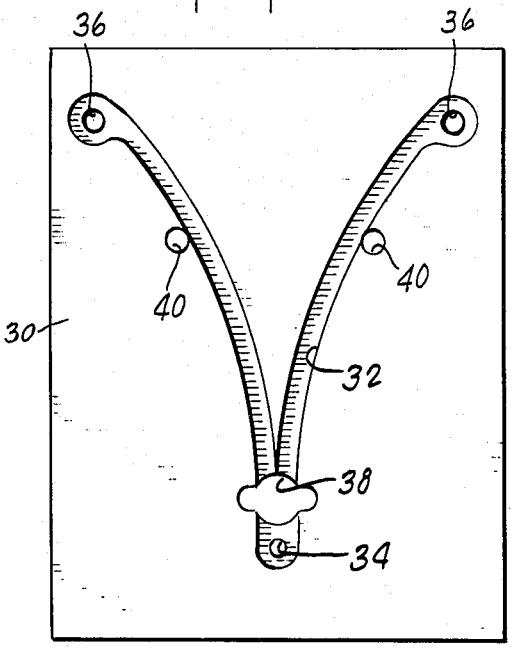
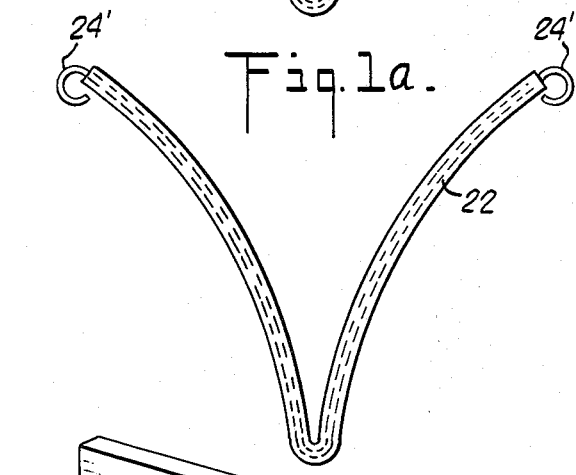
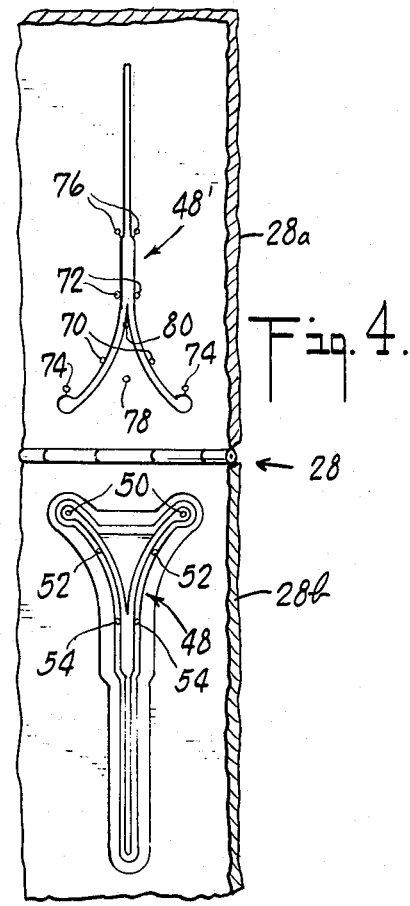
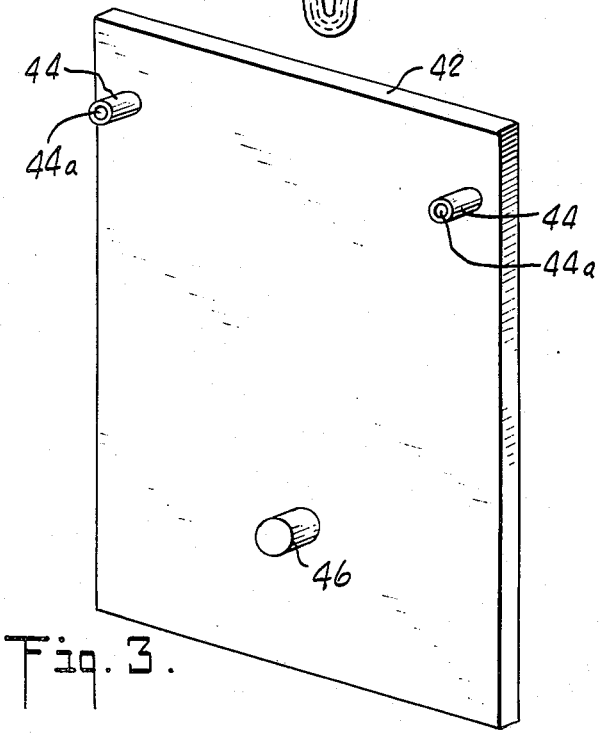

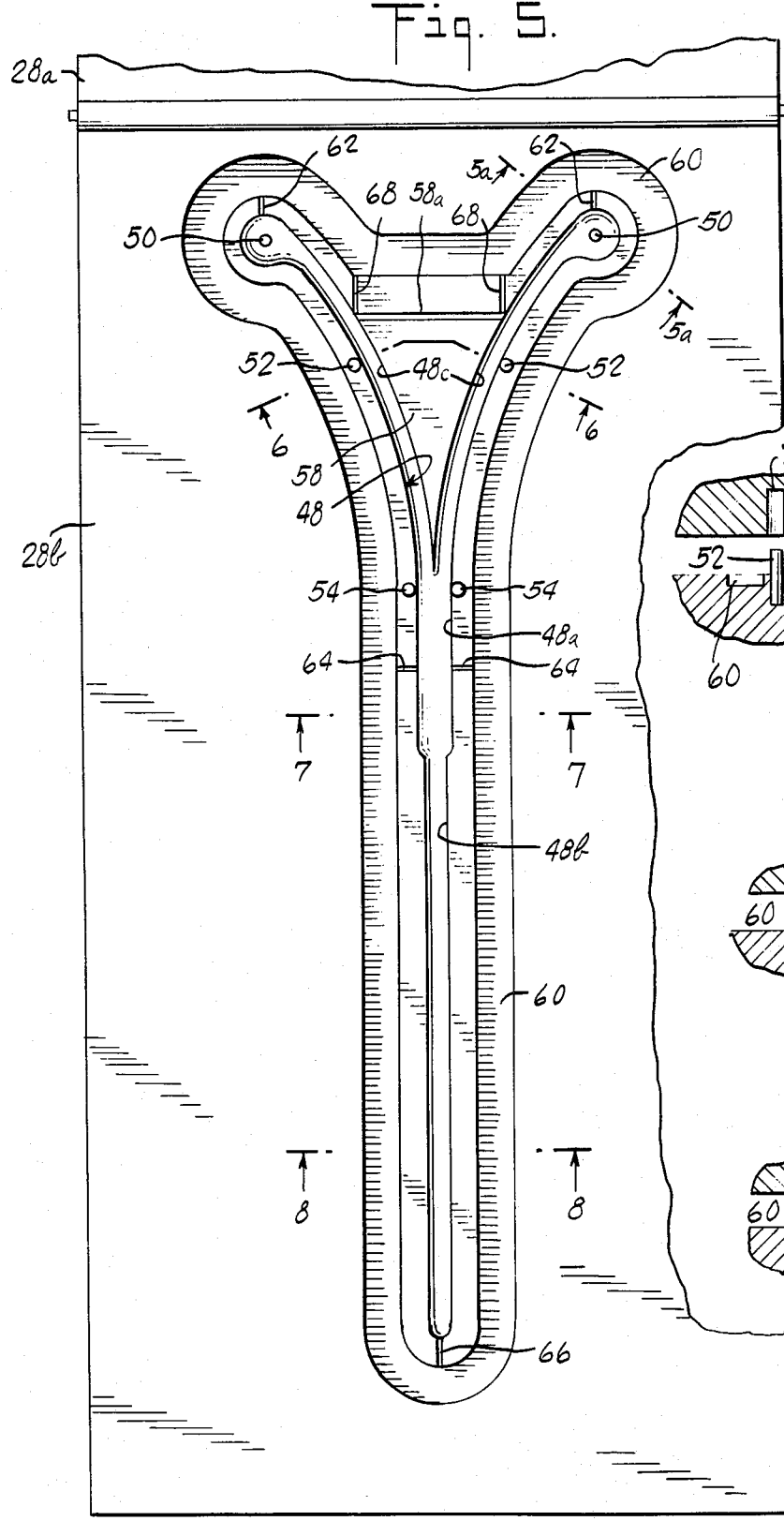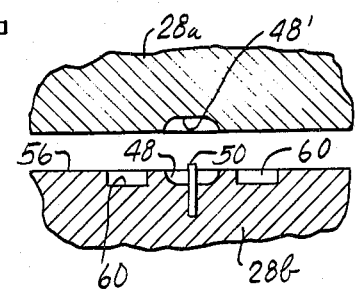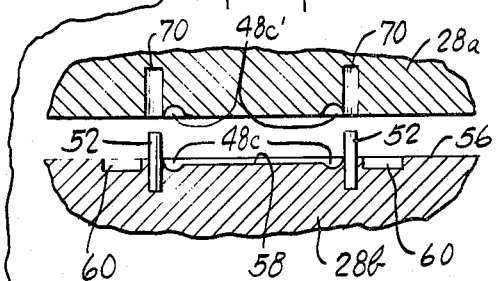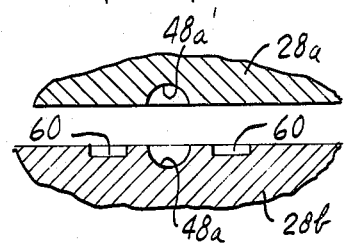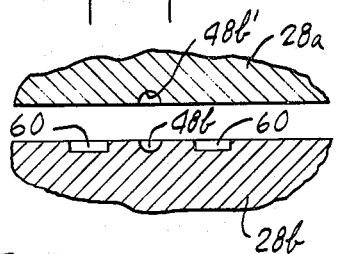

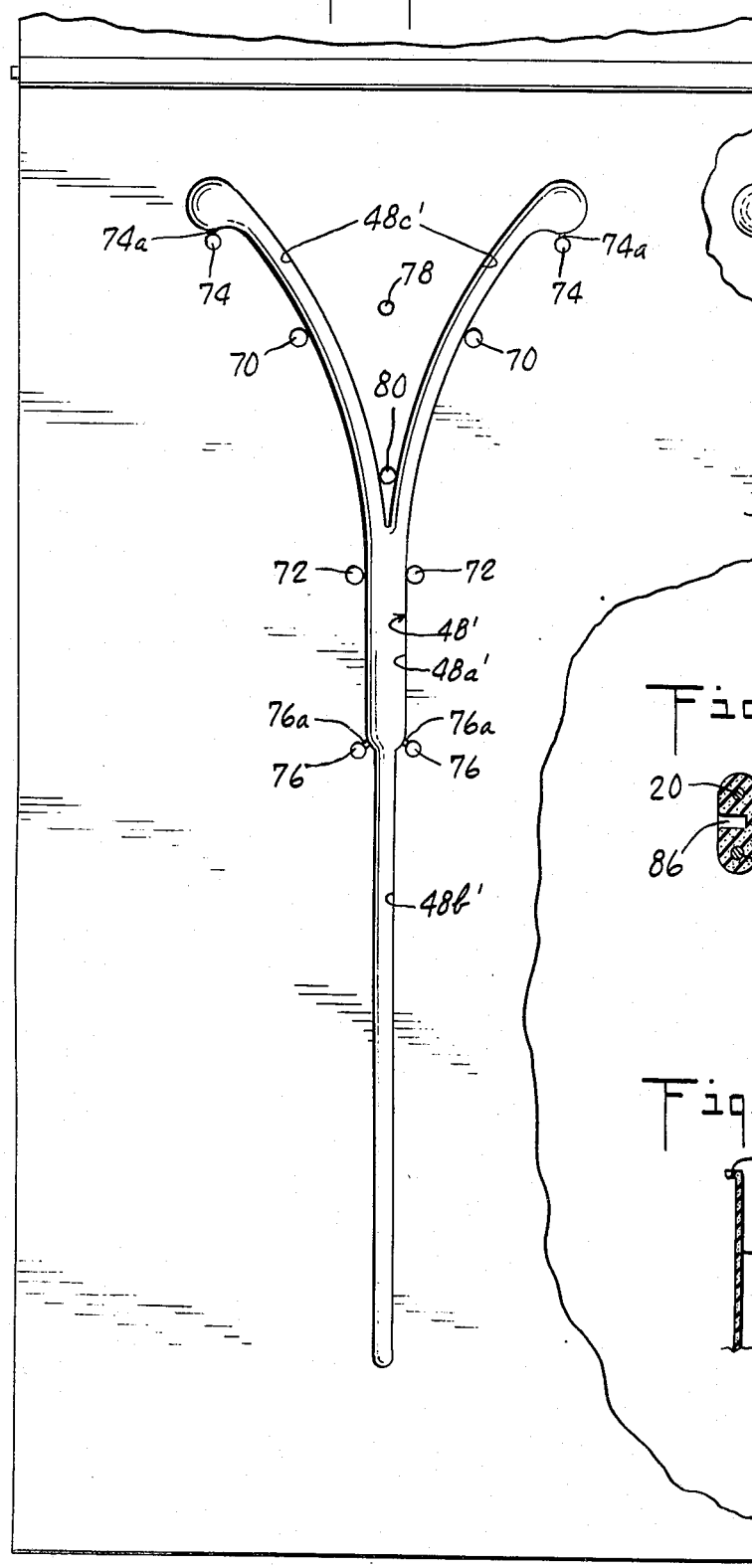
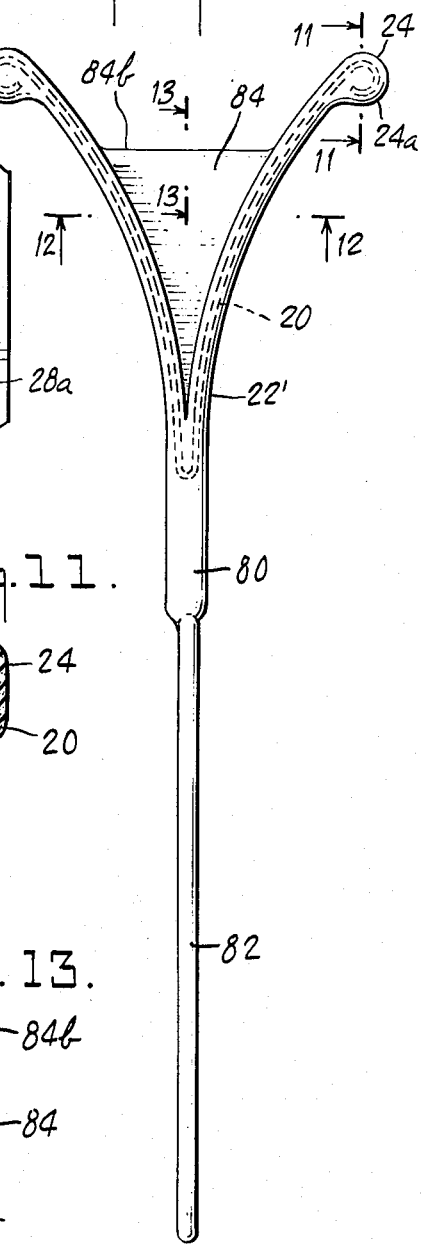
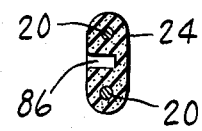
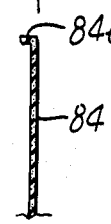
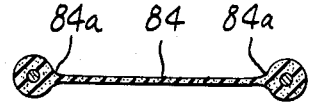

MOLDING APPARATUS FOR MAKING AN INTRAUTERINE DEVICE

BACKGROUND AND BRIEF DESCRIPTION OF THE INVENTION

This invention relates to the making of an intrauterine (IUD) device. The invention is particularly directed to the making of an IUD of the type disclosed in U.S. Pat. No. 3,507,274 and in "Ypsilon : A new silicone-covered stainless steel intrauterine contraceptive device" by Samuel Soichet, M.D., Am. J. Obstet. Gynecol. (Dec. 1, 1972).

The making of this IUD in quantity has presented difficulties in the past inasmuch as it is essential that the spring wire forming the device be covered with a coating that is not harmful itself to a woman and which further completely covers the wire element to avoid the puncturing or cutting of any organ. The present invention is directed to the making of such an element.

In accordance with the invention, stainless steel spring wire, for example, already covered by silicone rubber, for example, is bent to a general V-shape in which the outer ends of the arms of the V are turned inwardly to form loops. This basic IUD element is placed within a channel in a mold with the arms of the V stressed slightly toward each other so that they have an outward bias. Within the mold the element is held in place by pins, and particularly pins alongside the mold channel and through the loops formed at the ends of the arms of the V. The sides of the mold channel extend to points inside of and substantially co-terminus with the surfaces of the pins alongside the channel. The element is thus positioned within the mold, and particularly within the channel therein. Silicone rubber or other suitable coating material is introduced into the closed mold, particularly into the channel and provides an overcoat of coating material to the already coated element. A single coating of silicone rubber compound, for example, is produced. By the provision of appropriate venting from the channel, air is cleared from the channel as silicone rubber, for example, is introduced therein. In this fashion a non-flawed covering of the basic IUD element is provided.

The channel within the V-shaped IUD element is positioned may be of general Y-shape so as to provide a tail extending away from the joinder of the arms of the V. Additionally, the molding process may provide a flexible web of coating material that joins together the two arms of the element. The region of the mold that provides this web has edge portions thereof which lead into the channel within which the IUD element is positioned. The surfaces of these edge portions are curved so as to provide a sufficient amount of material joining the web with the arms of the element to create a strong bind.

By the use of the pins within the mold, in particular, the element is maintained in correct alignment within the mold to provide a complete coating over the basic element. By the appropriate placement of sprue holes and passages along with venting passages, a uniform flow of coating material is provided, which also helps achieve the uniform coating of the basic element.

The invention will be more completely understood by reference to the following detailed description, which is to be read in conjunction with the appended drawings.

BRIEF DESCRIPTION OF THE DRAWINGS

FIG. 1 is a plan view of a basic IUD element prior to its being positioned in a mold for overcoating in accordance with the invention.

FIG. 1a is a plan view of an element similar to that of FIG. 1, in which the ends thereof leave unexposed the underlying wire structure.

FIG. 2 is a plan view of a loading jig useful in loading the element of FIG. 1 into a mold.

FIG. 3 is a perspective view of a jig used to transfer an IUD element from the jig of FIG. 2 into a mold.

FIG. 4 is a perspective view of an open mold in accordance with the invention.

FIG. 5 is a plan view of one of the mold sections shown in FIG. 4.

FIGS. 5a, 6, 7, and 8 are sectional views taken along the corresponding section lines of FIG. 5, drawn to an enlarged scale.

FIG. 9 is a plan view of the other section of the mold of FIG. 4.

FIG. 10 is a plan view of an IUD molded in accordance with the present invention.

FIGS. 11, 12 and 13 are sectional views of the IUD shown in FIG. 10.

DETAILED DESCRIPTION

Referring to FIG. 1, a basic IUD element is shown suitable for overcoating in accordance with the present invention. In particular, the element is generally V-shaped and may include a spring wire 20 of stainless steel, for example. As an example, number 302 stainless steel spring wire may be used which is drawn to an appropriate diameter to obtain the appropriate temper. The final diameter of the wire employed in the basic IUD element may be 0.016 or 0.018 or 0.020 inch, e.g. The diameter of the wire employed in the IUD element determines the "springiness" of the element, i.e., the return force exerted by the arms of the V-shaped element as they are moved inwardly, for example, from the position shown in full lines to the position shown in dotted lines in FIG. 1.

The IUD element includes a covering 22 of suitable material which is non-toxic to the human body such as a silicone rubber compound. This compound may have a Shore A. Durometer of from 40 to 80, and formulated with ingredients which are nontoxic and of F. D. A. approved type, having high-tear strength, a tensil strength of over 1000, and a delayed action curing system which is not scorchy. In practice the stainless steel wire employed may be provided in coil form with a silicone rubber covering thereon. The covered wire is then bent to the shape shown in FIG. 1, and for this purpose the curvature of the covered wire prior to forming or bending should generally not be more than 3 inches in a 6 foot length of material.

As noted above, the rubber covered stainless steel wire is bent to the general V-shape shown in FIG. 1. The ends of the arms of the V are looped as at 24, i.e., they are bent to a relatively small radius so as to provide rounded tips. In the bending process part of the silicone rubber covering 22 may become torn, and the underlying wire element 20 may be exposed, as illustrated at 24' in FIG. 1a. It is not essential for the molding process, to be explained in detail below, that the wire element 20 be completely covered initially with a covering material.

In the bending of the rubber covered wire element to the V-shape shown in FIGS. 1 and 1a, a space 26 should be left in the region of the joinder of the arms of the V to each other. In other words, the apex of the V-shaped element should be somewhat rounded. The space 26 is to permit the overcoating of covering material in the region of the apex of the V, to be explained below in more detail.

The basic IUD element consisting of wire 20 and covering 22 is placed in a mold 28 shown in FIG. 4. For this purpose a loading jig 30 shown in FIG. 2 may be employed. The jig may be made of any suitable heat-resistant and non-heat conductive material and is grooved as at 32 to receive the IUD element shown in FIGS. 1 and 1a. In positioning the IUD element within the jig of FIG. 2, the element is stressed so that the arms thereof are moved inwardly to the position shown in dotted lines in FIG. 1. Thus, within the jig, the arms have an outward bias tending to return them to the position shown in full lines in FIG. 1.

The loading jig 30 includes a pin 34 in the apex region of the channel for the purpose of registering the apex of the V-shaped IUD element within the channel. The jig also includes holes 36 at the outer ends of the channel 32, a hole 38 near the apex of the channel, and holes 40 at intermediate points along the channel. The holes 36 and 38 permit pins to pass therethrough for the purpose of pushing the IUD element out of the loading jig, as about to be explained. The hole 38 also serves, as do the holes 40, to accommodate pins in the mold 28 of FIG. 4 when the loading jig is positioned thereagainst, as about to be explained.

In transferring the IUD element from the loading jig 30 of FIG. 2 to the mold of FIG. 4, a pusher plate 42 shown in FIG. 3 is employed. The plate includes pins 44 and 46. The pins 44 pass through the holes 36 in the loading jig 30; the pin 46 passes through the hole 38 in the loading jig.

With reference to FIG. 4, the mold 28 includes mold sections 28a and 28b. The loading jig 30 containing the IUD element is positioned against the mold section 28b which has a channel 48 therein to receive the IUD element. The mold section 28 includes pins 50 within the channel 48 at the outer ends thereof as well as pins 52 and 54 at points adjacent the channel. These pins are for the purpose of registering the IUD element within the mold channel 48. In particular, the pins 50 pass through or engage the rounded loops 24 of the IUD element and extend within the holes 36 of the loading jig. Pins 52 in the mold section 28b adjacent the channel 48 extend through the holes 40 in the loading jig, while pins 54 extend through the hole 38 in the loading jig. With the loading jig in position against the mold section 28b as just explained, the pusher plate 42 is employed to push the IUD element from the loading jig into the channel 48. For this purpose it will be noted that the pin 46 extends through the hole 38 in the loading jig and bears against the apex of the V-shaped IUD element. This pusher pin passes between the registry pins 54 in the mold section 28b. The pins 44 of the pusher plate have holes 44a included therein within which the pins 50 of the mold section 28b may be positioned. In this fashion the IUD element is pushed from the loading jig into the channel 48 of the mold section.

FIG. 5 shows the mold section 28b in greater detail. It will be noted that the upper part of the channel 48 is V-shaped to receive the IUD element from the loading jig 30. The pins 50 at the outer end of the channel 48 pass through the loops 24 at the outer ends of the arms of the V-shaped IUD element. With reference to FIG. 5a, it will be seen that the pins 50 extend slightly above the surface 56 of the mold section 28b. Thus these pins securely hold the outer ends of the V-shaped IUD element. The pins 52 and 54 adjacent the channel 48 also serve to prevent the element from leaving the channel. As will be noted from FIG. 6 in particular, the sides of the channels 48c and 48c' extend to points inside of and substantially co-terminus with the surfaces of the pins 52 and 54. These latter pins retain the IUD (preform) element in place and do not interfere with the flow of molding material about the preform element. During the molding process, to be explained in more detail below, the high temperature of the mold (in the order of 325°F.) normally tends to create movement of the IUD element within the mold. The pins 50, 52 and 54 prevent such movement and provide for accurate registry of the IUD element within the channel 48.

As will be noted from FIG. 5, the channel 48 is V-shaped at the upper end. The channel also has a lower extension 48a that narrows to a final tail section 48b within the mold.

The curvature of the mold channel 48 in the mold section 28b is shown by the various sections of FIGS. 5a, 6, 7 and 8. It will be noted that in most sections the curvatures at the edges of the channel is rather sharp. However, note in FIG. 6 that the curvatures of the channel sections 48c at the inside edges of the channel section is gradually curved rather than sharply curved, e.g., a radius of approximately 0.015 to 0.020 inch. This gradual curvature provides for a greater amount of material to be provided as an overcoat for the purpose of securely bonding a web to the arms of the V-shaped element, as will be described in more detail below. For the purpose of forming a web, the channel sections 48c lead into a region of the mold designated 58 in FIGS. 5 and 6. This region of the mold is slightly undercut from the surface 56 of the mold as shown in FIG. 6. As shown in FIG. 5, the region 58 is terminated by a channel 58a at the upper part thereof. The channel 58a is for the purpose of forming a bead on the flexible web that is formed, which will be described in more detail below.

The mold section 28b shown in FIG. 5 includes an overflow channel 60 therein. This channel 60 is also shown in the sectional views of FIGS. 5a, 6, 7 and 8. The mold channel 48 is joined to the overflow channel 60 by means of passages 62 (at the outer end of the arms of the mold channel 48), 64 (leading from the mold channel section 48a), 66 (at the end of the channel extension 48b) and 68 (leading from the channel sections 48c). These passages provide for the venting of air from the mold channel 48 during the molding process, to be described in more detail below, so as to ensure that coating material completely fills the mold channel 48 surrounding the IUD element therein to provide for a complete and total overcoat of that element, along with the formation of a flexible web between the arms of the element, with no flaws therein which might be occasioned by the presence of air.

The other mold section 28a is shown in detail in FIG. 9. That mold section includes a channel 48' which corresponds to channel 48 of the other mold section 28b. The sections 48a' and 48b' are in registry with the sections 48a and 48b of the other mold section. The edges of the mold channel 48c' in this section of the mold are also gradually curved, e.g., having a radius of 0.015 to 0.020 inch as noted above in connection with the other mold section to provide for a greater amount of material in the web that is formed, as described above. The mold section 28a also includes holes 70 that are in registry with pins 52, as will be noted from FIG. 6. Holes 72 are also included in the mold sections 28a, which are in registry with pins 54 shown in FIG. 5. Thus, when the two mold sections 28a and 28b are positioned against each other for the molding of coating material about the IUD element within the mold, the pins 52 and 54 are accommodated by the holes 70 and 72. With respect to the pins 50 in the mold section 28b which pass through or engage the loops formed at the ends of the arms of the IUD element within the mold, these are positioned within the mold channel 48' as shown in FIG. 5a. The pins 50 terminate short of the upper surface of the mold channel 48'.

The mold section 28a of FIG. 9 also includes sprue holes 74 and 76 located respectively adjacent to the ends of the mold channel 48c' and an intermediate region of the mold channel adjacent the mold channel section 48a'. These sprue holes are connected to the mold channel 48' by sprue passages 74a and 76a. Additionally, two other sprue holes 78 and 80 are included within the region between the mold channel sections 48c'. The sprue holes and passages are for the purpose of introducing coating material within the mold to coat the IUD element and to form a flexible web, as about to be explained.

When the mold sections 28a and 28b shown in FIG. 4 are positioned against each other, with an IUD element of the type shown in FIG. 1 or FIG. 1a positioned within the channel 48 of the mold section 28b, coating material such as silicone rubber is introduced into the sprue holes 74, 76, 78 and 80 at a suitable temperature and pressure (the mold is maintained also at a suitable temperature). The coating material fills the channels 48 and 48' completely covering the IUD element within the mold and forming a bond with the covering 22 that is already on that element (see FIGS. 1 and 1a). As the coating material fills the channels 48 and 48', air is forced out the vent passages 62, 64, 66 and 68 so that the mold channels 48 and 48' are completely filled with coating material. After all air is vented, coating material itself flows outwardly through the vent passages and into the overflow channels 60. Thus no air is entrapped within the mold channels 48 and 48', avoiding any flaws in the finished product.

After the introduction of the coating material, the hot temperature of the mold vulcanizes the material so introduced, the material sets, and then the mold is opened following which the finished, molded product shown in FIG. 10 is removed from the mold.

As shown in FIG. 10, the final, finished IUD element consists of the wire element 20 covered by a single, unitary coating 22' of covering material, e.g., silicone rubber. The silicone rubber added to the mold is bonded to the covering 22 (See FIGS. 1 and 1a) preliminarily covering the wire element prior to its introduction into the mold. From FIG. 10 it will be apparent that all portions of the wire element 20 are completely covered by covering material. In the regions of the loops 24 of the IUD, extra covering material, as at 24a in FIG. 10, is provided (by appropriate shaping of the mold channels 48 and 48') for added covering of the wire 20 to give added protection against puncture of an organ. The IUD element itself is of general Y-shape as it will be noted, and includes a section 80 beneath the wire element 20 that constitutes the beginning of a tail extending downwardly from the apex of the V-shaped arms of the element. This tail leads into a narrower tail 82 as shown.

The IUD element as molded also includes a flexible web 84 which is formed by the introduction of the covering material through the sprue holes 78 and 80 and into the region 58 of the mold (see FIGS. 5 and 6). This flexible web is securely bonded to the arms of the V-shaped portion of the IUD element by virtue of the gradual curvature of the mold channels 48c and 48c' as described above. This gradual curvature of the mold channels provides additional covering or coating material in the region where the web 84 is bonded to the arms of the V-shaped IUD element. This additional covering material, designated 84a in FIG. 12, provides a secure bond of the flexible web 84 to the arms of the element, ensuring that the bond does not tear. In this respect, it will be recalled that the IUD element was stressed inwardly when introduced into the loading jig 30 of FIG. 2 and thence into the mold 28 of FIG. 4. Accordingly, the web 84 is under tension in the final product, with the arms of the IUD element urged outwardly because of the prestressing inwardly of the element prior to the molding operation. A secure bond between the flexible web 84 and the arms of the element is essential.

Additionally, the flexible web 84 includes a bead 84b at the forward edge thereof shown in FIG. 13. This bead is produced by the introduction of coating material into the mold channel 58a of FIG. 5. This bead 84b further strengthens the flexible web 84 and prevents it from being torn along its leading edge.

As shown by the sectional view of FIG. 11, the tip portion 24 of each of the arms of the V-shaped part of the IUD element includes a hole 86 therein. This hole, which does not extend entirely through the tip section, is occasioned by the pin 50 used to register the tip of the IUD element within the mold 28, as described above.

There is thus produced an IUD element consisting of an underlying stressed wire structure completely covered by covering material which is non-toxic to the body and which prevents any harm to the body's organs. While the production of a single IUD element has been described, it is clear that the mold 28 shown in FIG. 4 may include a plurality of sections such as those designated 28a and 28b to provide for the simultaneous molding of a plurality of IUD elements. Similarly, the loading jig 30 and the pusher element 42 shown in FIGS. 2 and 3 may be adapted for multiple loading of such IUD elements.

The invention as embodied in the embodiments described above is subject to modification. For example, while silicone rubber has been described as a coating material, other coating materials may be employed. Further, an initial covering of one material may be followed by a covering of another, different material. Still further, while at the present time an already covered basic wire element is utilized in the molding process, the pins which secure registry of that element and the sprue holes and passages and vent passages together provide for the unique molding of a product and could be utilized in conjunction with the overcoating of a wire element, for example, that is not preliminarily covered with a covering material.

Accordingly, the invention should be taken to be defined by the following claims.

We claim:

1. A mold for molding an intrauterine device comprising means defining an elongated channel in the mold for holding an intrauterine device preform element and into which channel molding material is introduced, and a plurality of pins, said channel having sides extending to points inside of and substantially co-terminus with the surface of each of said pins, said pins retaining said preform element in position prior to mold closure such that when said mold is closed said preform element is entirely within said channel and said pins do not interfere with the flow of molding material about said preform element.

2. Apparatus according to claim 1 in which said mold channel includes V-shaped portions joined together by a web-forming cavity, and said V-shaped channel portions have edges thereof joined to said web-forming cavity by curved surfaces to provide for the build-up of material in the molding of the intrauterine device.

3. Apparatus according to claim 2 in which said web-forming cavity includes a transverse channel joining together said V-shaped portions to provide for the formation of a bead in the molded intrauterine device.

4. Apparatus according to claim 1 including further pins inside said channel at the ends thereof for positioning loop-shaped parts of said preform element, said further pins extending from one surface of said channel through the loops of said loop-shaped parts and toward but not fully to an opposing surface of said channel.

* * * * *